United States Patent
Muhammad et al.

(10) Patent No.: US 6,742,572 B2
(45) Date of Patent: Jun. 1, 2004

(54) MOUNTING BRACKET FOR HEAT EXCHANGER CORES

(75) Inventors: Anis Muhammad, Mississauga (CA); John W. Izard, Brampton (CA); Silvio Tonellato, Mississauga (CA); Eric Luvisotto, Mississauga (CA)

(73) Assignee: Dana Canada Corporation, Oakville (CA)

( * ) Notice: Subject to any disclaimer, the term of this patent is extended or adjusted under 35 U.S.C. 154(b) by 0 days.

(21) Appl. No.: 10/329,231

(22) Filed: Dec. 26, 2002

(65) Prior Publication Data

US 2003/0159805 A1 Aug. 28, 2003

(30) Foreign Application Priority Data

Dec. 27, 2001 (CA) ............................................. 2366227

(51) Int. Cl.[7] ............................... F28F 9/00; F28F 3/00; F28D 1/02; F24H 9/06
(52) U.S. Cl. ........................ 165/67; 165/153; 165/166; 248/232
(58) Field of Search ................................ 165/166, 167, 165/67, 68, 76, 149, 153, 152, 140, 170, 175; 180/68.4; 248/232, 233

(56) References Cited

U.S. PATENT DOCUMENTS

| | | | | |
|---|---|---|---|---|
| 1,246,325 A | | 11/1917 | Rohmer | |
| 4,258,785 A | | 3/1981 | Beldam | |
| 5,058,662 A | * | 10/1991 | Nguyen | 165/76 |
| 5,069,275 A | | 12/1991 | Suzuki et al. | |
| 5,086,832 A | * | 2/1992 | Kadle et al. | 165/76 |
| 5,183,103 A | | 2/1993 | Tokutake | |
| 5,407,161 A | | 4/1995 | Mulkeran | |
| 5,429,182 A | | 7/1995 | Hanafusa | |
| 5,535,819 A | * | 7/1996 | Matsuura | 165/149 |
| 5,570,737 A | | 11/1996 | Tokutake | |
| 5,692,559 A | * | 12/1997 | Cheong | 165/148 |
| 5,720,341 A | * | 2/1998 | Watanabe et al. | 165/135 |
| 5,791,402 A | | 8/1998 | Dumetz | |
| 5,899,263 A | | 5/1999 | Tokutake | |
| 5,964,282 A | * | 10/1999 | Seiler et al. | 165/153 |
| 6,263,954 B1 | * | 7/2001 | Nakayama | 165/67 |
| 6,405,788 B1 | * | 6/2002 | Balthazard | 165/67 |

FOREIGN PATENT DOCUMENTS

| | | |
|---|---|---|
| DE | 3215961 | 11/1983 |
| FR | 2527325 | 11/1983 |
| FR | 2550618 | 2/1985 |
| FR | 2748559 | 11/1997 |
| JP | 3-164694 | 7/1991 |

\* cited by examiner

*Primary Examiner*—Henry Bennett
*Assistant Examiner*—Tho V Duong
(74) *Attorney, Agent, or Firm*—Ridout & Maybee LLP

(57) ABSTRACT

A heat exchanger and mounting bracket therefor where the heat exchanger is formed of stacked plate pairs or tubes having longitudinal peripheral edge portions joined together. The mounting bracket has spaced-apart, C-shaped clips attached to the peripheral edge portions of different plate pairs and mounting portions attached to the C-shaped clips and extending outwardly from the plate pairs.

20 Claims, 5 Drawing Sheets

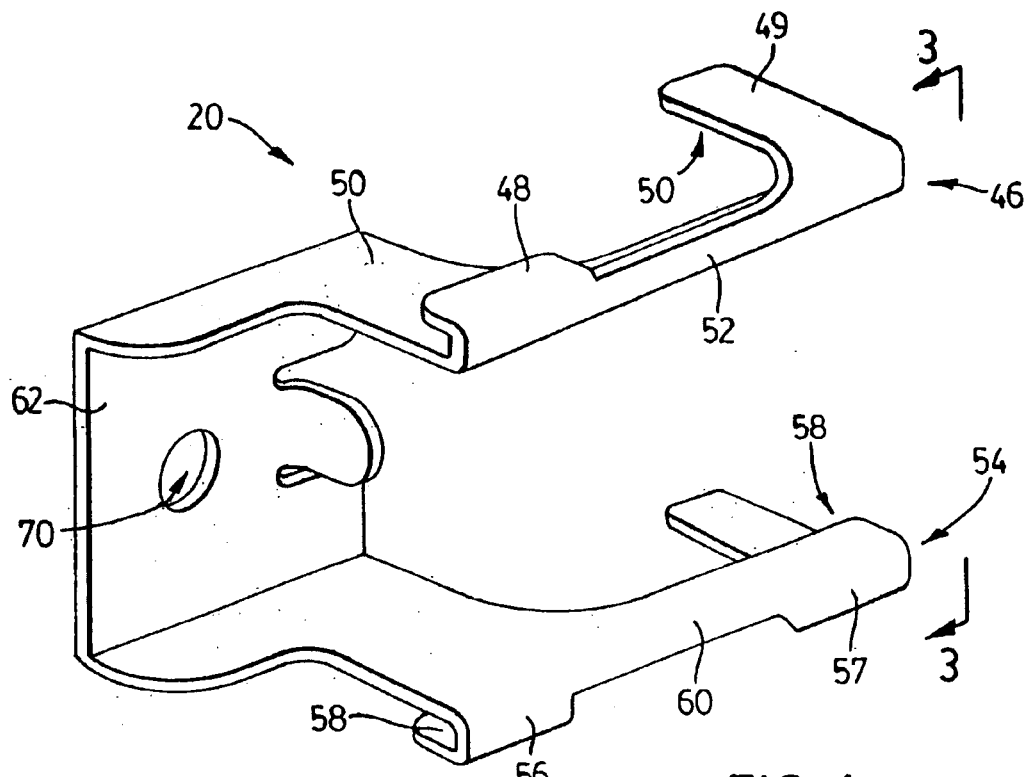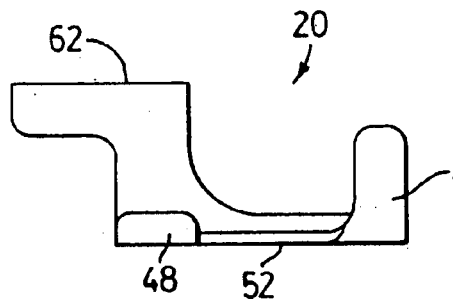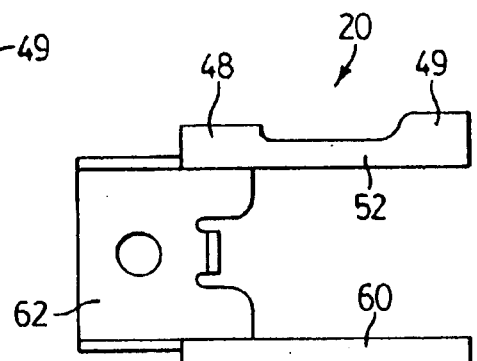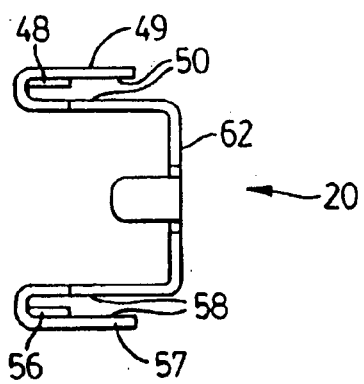

MOUNTING BRACKET FOR HEAT EXCHANGER CORES

This application claims priority to Canadian Patent Application No. 2,366,227 filed Dec. 27, 2001.

FIELD OF THE INVENTION

The present invention relates to stacked plate devices such as heat exchangers, and more particularly, to mounting brackets therefor.

BACKGROUND OF THE INVENTION

Heat exchanger cores are commonly formed from a plurality of thin, substantially flat tubes, stacked upon one another in spaced relation, which extend between a pair of spaced-apart manifolds or headers. The manifolds are often simply constructed from pipe, suitably perforated to receive the flat tubes. Exemplary of this construction is the heat exchanger core described in U.S. Pat. No. 5,183,103 (Tokutake), issued Feb. 2, 1993. However, it is also known to seal the ends of the tubes, and provide the tubes with bosses which, when the tubes are suitably stacked and connected together, by brazing or the like, mate with one another to form the manifolds. It is known to use welded tubes for this latter type of construction, and also to use tubes formed from pairs of formed plates, which are sealed together during the brazing process. U.S. Pat. No. 5,964,282 (Seiler et al.), issued Oct. 12, 1999, is exemplary of this latter construction.

For the purpose of mounting, i.e. within the engine compartment of a vehicle or the like, heat exchanger cores of the type comprising perforated pipe headers, it is known to braze a mounting bracket to the header. The mounting bracket usually includes a lug adapted to be secured to the vehicle frame. Preferably, the mounting bracket is provided with a portion which is capable of resiliently engaging the exterior of the header to keep the mounting bracket in place during the brazing process, so as to avoid the need for auxiliary clamping tools, which can add to cost and can absorb heat in a brazing oven, resulting in poor quality braze joints. The mounting brackets taught in U.S. Pat. No. 5,069,275 (Suzuki et al.), issued Dec. 3, 1991, are exemplary of this construction.

However, while this type of mounting bracket is known to be used in association with perforated-pipe type manifolds, it is not known to be used in association with paired-plate type heat exchanger cores having manifold-forming elements, such as that described in U.S. Pat. No. 5,964,282. In this latter type of heat exchanger, the core typically is provided with heavier gauge end plates with attached lugs, thereby to provide for mounting. A difficulty with this type of mounting is the limited flexibility it provides in terms of mounting location.

SUMMARY OF THE INVENTION

In the present invention, a mounting bracket is provided for a stacked plate core device of the type comprising a plurality of paired-plates having joined peripheral edge portions. The mounting bracket attaches to the peripheral edge portions of the plate pairs, thus providing superior strength, flexibility as to the location of the brackets, and minimal interference with fluid flow through the core.

According to one aspect of the invention, there is provided a mounting bracket for use in a stacked plate core device of the type having a plurality of stacked plate pairs. Each plate pair includes first and second plates having peripheral edge portions joined together and central planar portions spaced apart to define a fluid passage therebetween. Each plate pair has spaced-apart inlet and outlet openings, the respective inlet and outlet openings being connected together to form manifolds for the flow of fluid through said fluid passages. The mounting bracket comprises a pair of spaced-apart, first and second, C-shaped clips adapted to engage the peripheral edge portions of different plate pairs. Also, a mounting portion is attached to the clips and extends therefrom, so that the mounting portion extends outwardly from the plate pairs, when the mounting bracket is attached thereto.

According to another aspect of the invention, there is provided a stacked plate core device comprising a plurality of stacked plate pairs. Each plate pair includes first and second plates having peripheral edge portions joined together and central planar portions spaced apart to define a fluid passage therebetween. Each plate pair has spaced-apart inlet and outlet openings. Means are provided for connecting together the respective inlet and outlet openings to form manifolds for the flow of fluid through said fluid passages. A mounting bracket has a pair of spaced-apart, first and second, C-shaped clips attached to the peripheral edge portions of different plate pairs. Also, the mounting bracket has a mounting portion attached to the clips and extending therefrom, so that the mounting portion extends outwardly from the plate pairs.

BRIEF DESCRIPTION OF THE FIGURES

Preferred embodiments of the invention will now be described, with reference to the accompanying drawings, in which:

FIG. 1 is a perspective view of a mounting bracket according to a first preferred embodiment of the present invention;

FIG. 2 is a top plan view of the mounting bracket of FIG. 1;

FIG. 3 is a right end view of the mounting bracket taken along lines 3—3 of FIG. 1;

FIG. 4 is a front elevational view of the mounting bracket of FIG. 1;

DETAILED DESCRIPTION OF THE PREFERRED EMBODIMENTS

With reference to FIG. 1, a first preferred embodiment of the present invention, namely, a mounting bracket 20 is illustrated.

Figure 5:
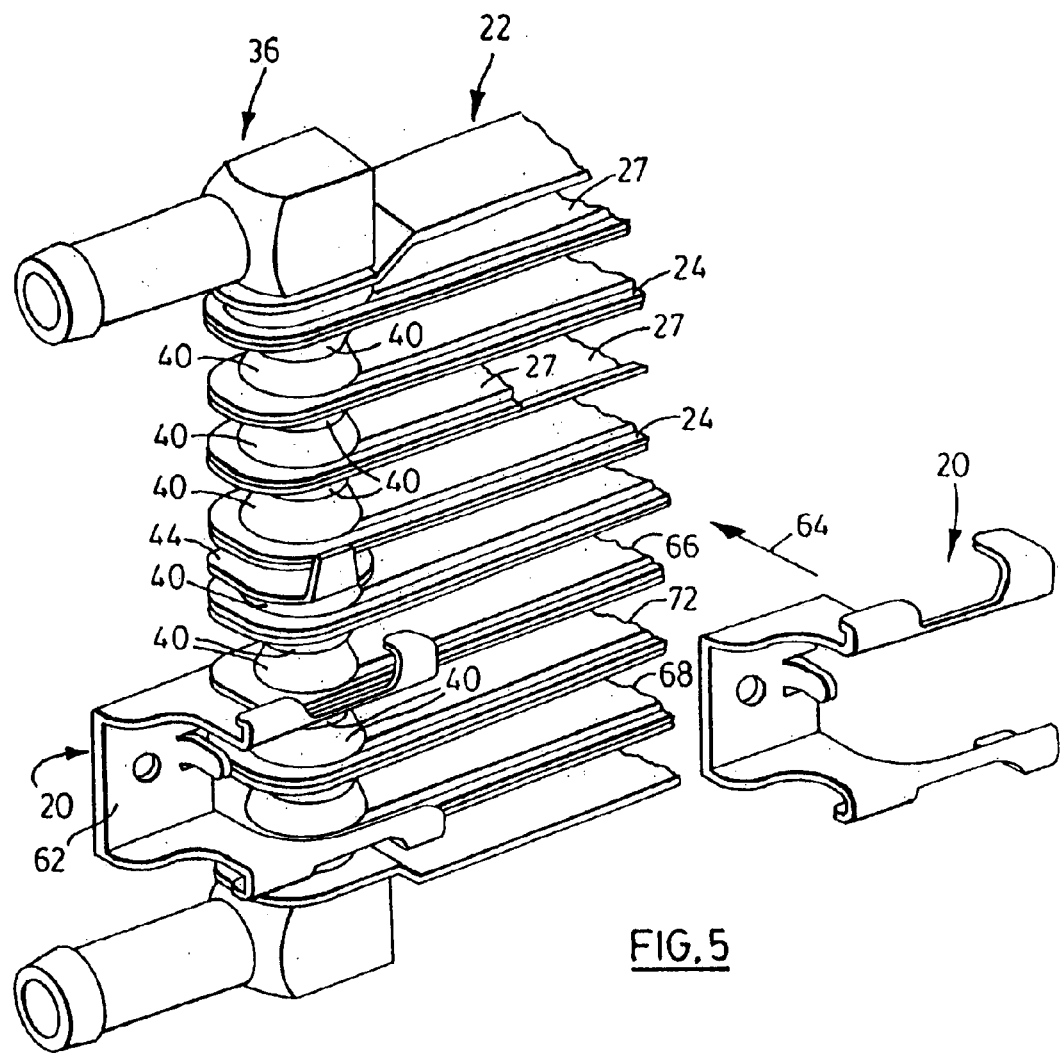
FIG. 5 is a perspective view showing one mounting bracket of FIG. 1 attached to a portion of a heat exchanger core and a second mounting bracket about to be attached to the core.
Figure 6:
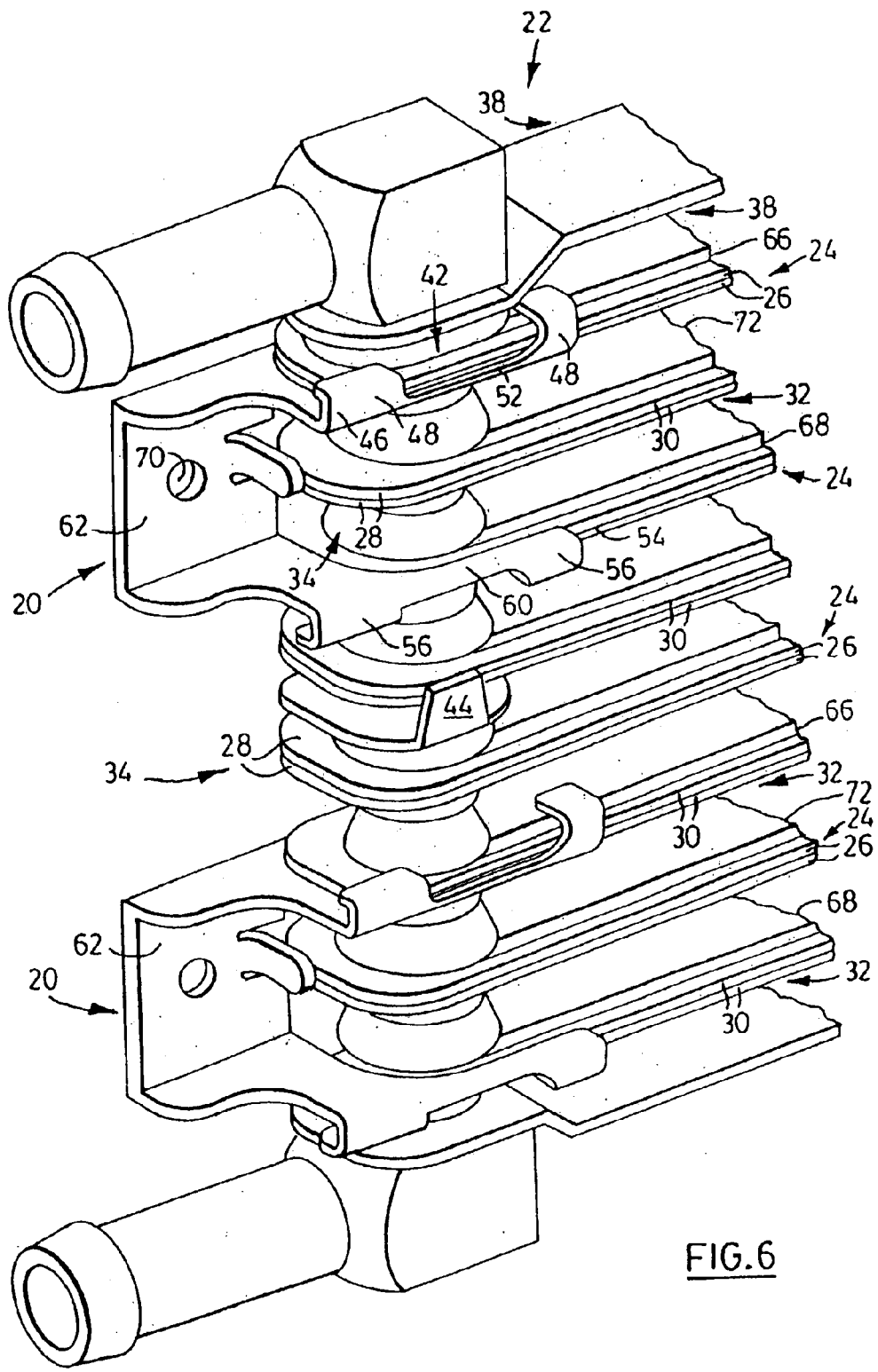
FIG. 6 is a view similar to FIG. 5, showing both mounting brackets attached to the heat exchanger core.
Figure 7:
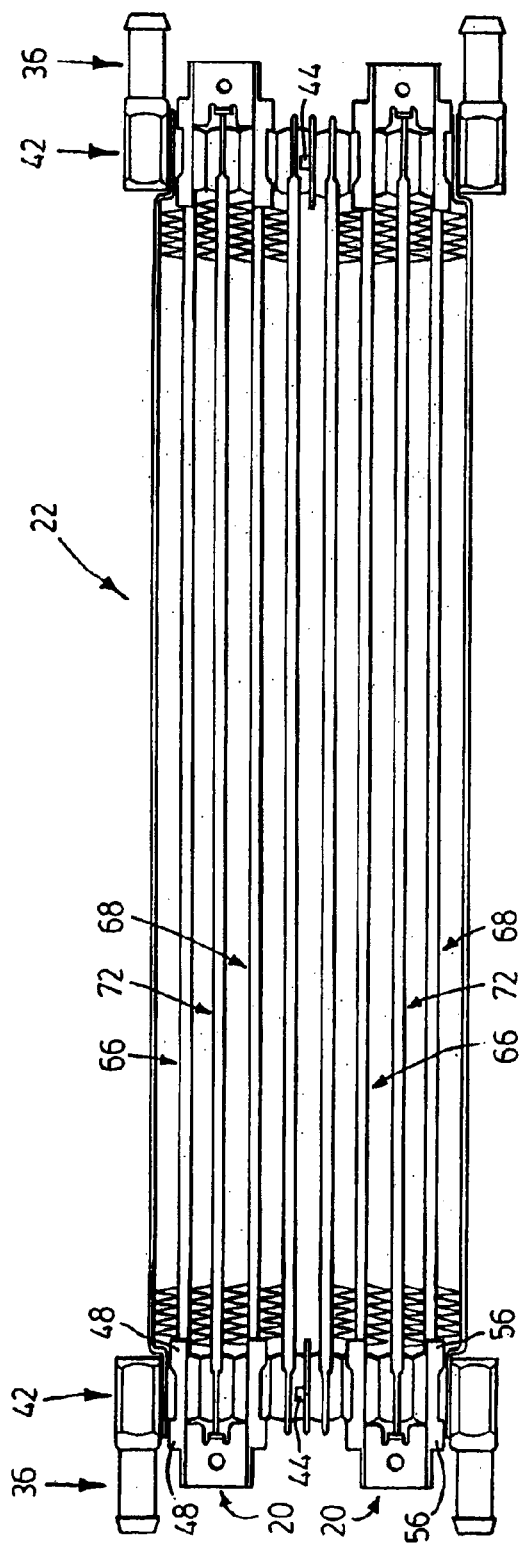
FIG. 7 is a front elevational view of the full heat exchanger represented by FIG. 6 with the addition of cooling fins between the plate pairs.

The mounting bracket 20 is for use with a stacked plate core device such as a heat exchanger core of a particular type, of which the heat exchanger core illustrated in FIGS. 5, 6 and 7 and designated with general reference numeral 22 is exemplary. As best indicated in FIG. 6, this particular type of heat exchanger core 22 comprises a plurality of stacked plate pairs or tubes 24. Each tube 24 is formed from a pair of first and second plates 26, each plate 26 having a central planar portion 27, a pair of longitudinally spaced end edges 28 and a pair of laterally-spaced side edges 30 respectively extending longitudinally between the end edges 28. Central planar portions 27 are spaced apart in each plate pair 24 to define fluid passages therebetween. End edges 28 and side edges 30 form peripheral edge portions that are joined together. The central planar portions of the plates are spaced apart to define fluid passages therebetween. The plates 26 are arranged in stacked relation and joined to one another along said side edges 30 such that the joined side edges 30 define respective tube sides 32 and the end edges 28 define respective tube ends 34. The plurality of tubes 24 are arranged in stacked, spaced relation with the tube ends 34 collectively defining respective ends 36 of the core 22, as indicated in FIG. 7, and the tube sides 32 collectively defining respective sides 38 of the core 22, as indicated in FIG. 6. As indicated in FIG. 5, this type of heat exchanger core 22 further comprises a plurality of raised abutting bosses or tube extension portions 40 interleaved between the tubes 24 in longitudinally spaced apart pairs and connected to the tubes 24 in sealed fluid communication. Extension portions 40 define respective inlet and outlet openings that are connected together by the extension portions 40 to form a pair of manifolds 42, disposed adjacent respective ends 36 of the core 22, for ingress of fluid to the tubes 24 and for egress of fluid from the tubes 24. The manifolds 42 are best indicated in FIG. 7.

It will be evident that in each of the examples previously discussed, the tube extension portions 40 take the form of mating bosses formed integrally with the plates 26. However, the tube extension portions 40 can be formed separately from the plates 26. As well, the heat exchanger core 22 illustrated in FIGS. 5, 6 and 7 includes optional baffles 44 which serve to compartmentalize the manifolds 42, thereby, in effect, providing separate heat exchanger circuits, if desired. As such, it should be understood that the scope of the invention is not limited to the specific heat exchanger cores illustrated and described herein.

With general reference to FIG. 1 through FIG. 7, the mounting bracket 20 of the first preferred embodiment will be seen to have a first clip part 46 including spaced-apart tab portions 48, 49, which are C-shaped as viewed in FIG. 3. Each of the C-shaped clips 48,49 defines respective contacting surfaces 50, and a central portion or spacer member 52 extends between and connects the clips 48,49. A second clip part 54, has spaced-apart tab portions or C-shaped clips 56,57. Clips 48,56 are a first pair of first and second inner clips and clips 49,57 are a second pair of first and second outer clips. Each clip 56,57 defines a respective contacting surface 58. A central portion or spacer member 60 extends between and connects the clips 56,57. The distal end portions of spacer members 52,60 are located remote from C-shaped clips 48,56 and include the outer pair of C-shaped clips 49,57. A mounting portion 62 is attached to and connects the first and second clips 48,56 and extends laterally or away therefrom, so that the mounting portion 62 extends outwardly from the plate pairs or tubes 24 when the mounting bracket is attached thereto.

The first clip part 46, the second clip part 54 and the mounting part 62 are shaped, dimensioned and arranged to permit the mounting bracket 20 to be positioned at an assembly position, shown in FIG. 6, upon a respective side 38 of the core 22, whereat the mounting bracket 20 grippingly engages the core 22 so as to permit subsequent permanent connection of the mounting bracket 20 to the core 22 by conventional connection techniques such as brazing, soldering, welding, adhesives or the like, without the need for auxiliary clamps (not shown). (For clarity, a mounting bracket 20 is also shown in FIG. 5 apart from the heat exchanger core 22, wherefrom it may be translated in the direction indicated by arrow 64 to the assembly position.)

Mounting portion 62 is shown in the drawings to extend generally parallel to the plate pair tube sides 32, but mounting portion 62 could be orientated in any other direction, even perpendicular to tube sides 32, if desired, to suit a particular mounting configuration for core 22.

The tab portions or C-shaped clips 48,49 of the first clip part 46 are disposed on opposite longitudinal sides of a respective manifold 42 with the contacting surfaces 50 of each clip 48,49 in receipt of or engagement with the peripheral edge portions of a side 32 of a first respective tube (designated with general reference numeral 66 in the Figures) and in lapped, contacting relation against each of the plates 26 which form the first respective tube 66. Similarly, the C-shaped clips 56,57 of the second clip part 54 are disposed on opposite longitudinal sides of the respective manifold 42 with the contacting surfaces 58 of each clip 56,57 in receipt of or engagement with the peripheral edge portions of a side 32 of a second respective tube (designated with general reference numeral 68 in the Figures) and in lapped, contacting relation against each of the plates 26 which form the second respective tube 68.

In the completed heat exchanger, the mounting portion 62 is disposed outwardly from the plate pairs 24 in a position suitable for subsequent mounting of the apparatus. As shown, the mounting portion 62 is formed with an aperture 70 shaped and dimensioned to receive a suitable mechanical fastener such as a nut and bolt assembly (not shown), to mount the heat exchanger core, although other conventional mounting arrangements are contemplated and considered to fall within the scope of the invention. For example, only, the mounting portion 62 could be formed with a threaded stud to be located in a corresponding hole in a vehicle frame (not shown). Mounting portion 62 could also be riveted, or staked to another mounting bracket, as described further below in connection with FIG. 9, in which case aperture 70 may not be required.

As illustrated, when the mounting bracket 20 is at the assembly position, the mounting portion 62 abuts the end edges 28 of the plates 26 of a third respective tube, designated with general reference numeral 72 disposed intermediate the first respective tube 66 and the second respective tube 68, thereby to improve stability of the mounting bracket 20. In the examples shown, the first respective tube 66, the second respective tube 68 and the third respective tube 72 are stacked directly upon one another. However, additional tubes may be disposed in between the first respective tube 66, the second respective tube 68 and the third respective tube 72. This increased stability is of particular advantage when the mounting bracket 20 is at the assembly position but has not been permanently connected to the heat exchanger core 22, as it lessens the likelihood of the mounting bracket 20 being inadvertently dislodged.

Once the mounting bracket 20 has been connected with sufficient permanence to the heat exchanger core 22, by brazing or the like, as discussed above, the mounting bracket 20 is of course less likely to be inadvertently dislodged, such that the foregoing feature assumes lesser importance. So as to increase the permanence of such connection, in the first preferred embodiment, the central portion or spacer member 52 of the first clip part 46 is in abutment against a side 32 of the first respective tube 66 and is in lapped, contacting relation with at least one of the plates 26 which form the first respective tube 66 when the bracket 20 is at the assembly position.

Similarly, the central portion or spacer member 60 of the second clip part 54 is in abutment against a side 32 of the second respective tube 68 and is in lapped, contacting relation with at least one of the plates 26 which form the second respective tube 68, when the mounting bracket 20 is at the assembly position.

The mounting bracket 20 of the first preferred embodiment of the present invention is intended to be permanently connected to the heat exchanger core 22 by brazing or soldering. As such, bracket 20 is constructed out of a suitable brazing material, such as brazing clad aluminum, so that abutting and lapped parts on the mounting bracket 20 and the heat exchanger core 22 will be brazed together, preferably simultaneously when the heat exchanger or core 22 is being brazed in a furnace brazing process. However, as previously indicated, it is possible to utilize other connection techniques, and the invention is considered to encompass mounting brackets constructed from other materials.

Figure 8:
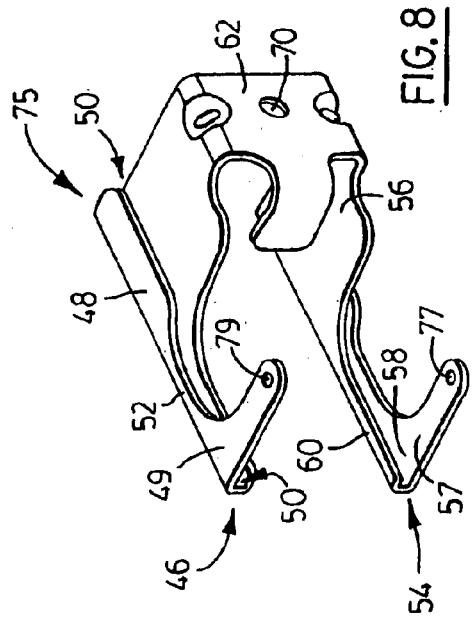
FIG. 8 is a perspective view of a mounting bracket according to a second preferred embodiment of the present invention.

A second preferred embodiment of a mounting bracket 75 is illustrated in FIG. 8. In this embodiment, like reference numerals are used to indicate components which are similar to those of the first preferred embodiment. It will be evident to persons of ordinary skill in the art that the second preferred embodiment has similar functionality to that of the first, and may be employed in an equivalent manner. Mounting bracket 75 has optional inwardly disposed projections 77, or dimples 79 as viewed from the exterior of bracket 75. Projections 77 can be provided to engage mating dimples formed in the central planar portions 27 of plate pairs 24.

Figure 9:
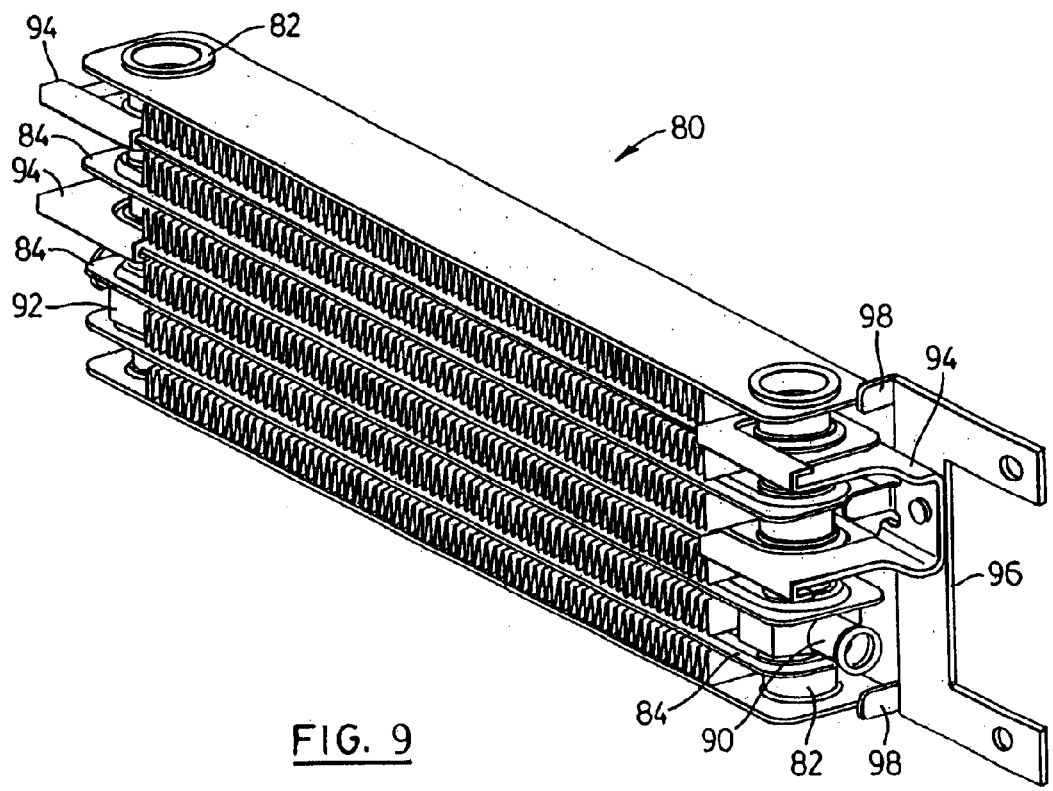
FIG. 9 is a perspective view of a heat exchanger having tubular manifolds associated with the plate pairs and yet another preferred embodiment of a mounting bracket attached thereto.
Figure 10:
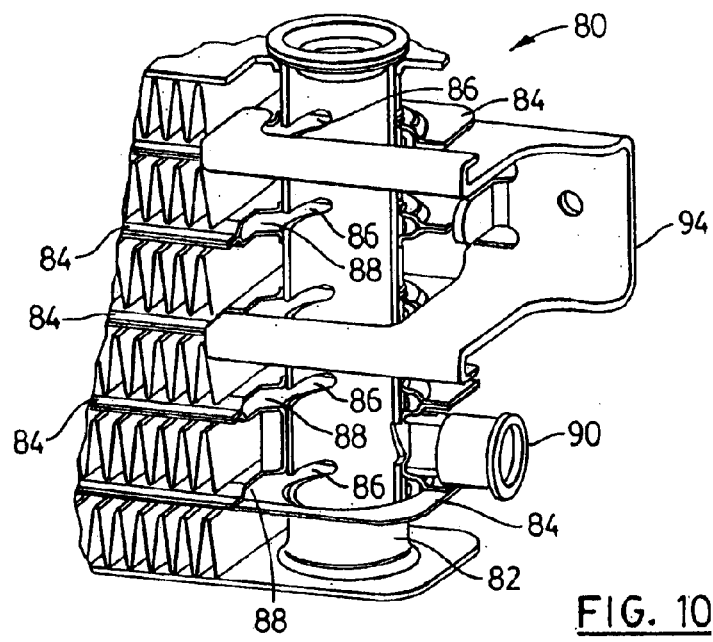
FIG. 10 is an enlarged perspective view, partly broken away of the right end portion of the heat exchanger shown in FIG. 9.

Referring next to FIGS. 9 and 10 another preferred embodiment of a stacked plate core device or heat exchanger 80 according to the present invention is shown. Heat exchanger 80 is similar to the embodiments described above, except that the respective inlet and outlet openings in the plate pairs or tubes are connected together by means of manifold tubes 82 passing therethrough. Manifold tubes 82 are joined to the peripheral edges of the respective inlet and outlet openings in plate pairs 84. Manifold tubes 82 have transverse openings 86 therein which communicate with the fluid passages 88 inside the plate pairs. Inlet and outlet fittings 90,92 communicate with manifold tubes 82. Mounting brackets 94 are similar to the embodiments described above.

FIG. 9 also shows an optional intermediate mounting bracket 96 that can be used between mounting bracket 94 and the structure to which heat exchanger 80 is intended to be mounted. Intermediate mounting bracket 96 can be riveted to mounting bracket 94 or attached by a staking operation referred to by the trade-mark A Toggle-lok@. Intermediate bracket 96 can also be brazed to bracket 94 and core 80 by using engaging tabs 98. Again, all the components of heat exchanger or core 80, including mounting brackets 94,96 can be brazed together simultaneously in a furnace brazing operation.

Finally, it is to be understood that while several preferred embodiments of the present invention are herein shown and described, it will be understood that various changes, in size and shape of parts, and otherwise, can be made. For example, whereas in the embodiments illustrated, the contacting surface of each tab portion or C-shaped clip of the first clip part is in lapped, contacting relation against each of the plates which form the first respective tube when the mounting bracket is at the assembly position, it is possible to construct the mounting bracket such that the first clip part is in lapped, contacting relation against just one of the plates of a plate pair. Similarly, it is possible to construct the mounting bracket such that the second clip part is in lapped, contacting relation against just one of the plates which form the second respective tube when the mounting bracket is at the assembly position. While the mounting brackets are shown to be connected to the plate peripheral edge portions on one side of the heat exchanger, the C-shaped clips could be arranged to engage the plate pairs on opposite sides of the plate pairs. Also, the first and second clip parts could be attached to adjacent plate pairs instead of having a third intermediary plate pair therebetween. As well, whereas the disclosure is directed primarily to the field of heat exchangers, the mounting bracket of the present invention may be used in association with any other fluid handling apparatus using plate pairs, for example, condensers, filtration devices, fuel cells and fuel reformers or processors. It will be evident that these modifications, and others which are obvious to persons of ordinary skill in the art, may be made without departing from the spirit or scope of the invention, which is accordingly limited only by the claims appended hereto, purposively construed.

What is claimed is:

1. A mounting bracket for use in a stacked plate core device of the type having a plurality of stacked plate pairs, each plate pair including first and second plates having peripheral edge portions joined together and central planar portions spaced apart to define a fluid passage therebetween; each plate pair having spaced-apart inlet and outlet openings, the respective inlet and outlet openings being connected together to form manifolds for the flow of fluid through said fluid passages; the mounting bracket comprising:

a pair of spaced-apart, first and second, C-shaped clips adapted to engage the peripheral edge portions of different plate pairs; and a mounting portion attached to said clips and extending therefrom, so that the mounting portion extends outwardly from the plate pairs when the mounting bracket is attached thereto.

2. A mounting bracket according to claim 1 wherein the mounting portion is located on one side of said C-shaped clips, and further comprising first and second spacer members extending respectively from the other side of said first and second clips, the spacer members being disposed in parallel, and adapted to engage the plate pair peripheral edge portions when the mounting bracket is attached thereto.

3. A mounting bracket according to claim 2 wherein the spacer members have distal end portions located remote from the C-shaped clips, wherein the pair of C-shaped clips is an inner pair of spaced-apart, C-shaped clips, and wherein said distal end portions include an outer pair of first and second, spaced-apart, C-shaped clips adapted to engage the plate peripheral edge portions.

4. A mounting bracket according to claim 3 wherein said first and second clips of said outer pair of C-shaped clips each include an extension portion that is adapted to overlap the respective plate central planar portions.

5. A mounting bracket according to claim 2 wherein the mounting portion includes an abutment portion which is adapted to engage an end of one of the plate pairs.

6. A mounting bracket according to claim 5 wherein the abutment portion is a transverse flange.

7. A mounting bracket according to claim 1 wherein the C-shaped clips are orientated in the same direction, so that the mounting bracket attaches to one side of the plate pairs.

8. A mounting bracket according to claim 3 wherein the C-shaped clips of the inner and outer pairs of C-shaped clips are all orientated in the same direction, so that the mounting bracket attaches to one side of the plate pairs.

9. A mounting bracket according to claim 2 wherein the mounting portion defines aperture means for attaching the mounting bracket to another member.

10. A stacked plate core device comprising: a plurality of stacked plate pairs, each plate pair including first and second plates having peripheral edge portions joined together and central planar portions spaced apart to define a fluid passage therebetween; each plate pair having spaced-apart inlet and outlet openings; means for connecting together the respective inlet and outlet openings to form manifolds for the flow of fluid through said fluid passages; a mounting bracket having a pair of spaced-apart, first and second, C-shaped clips attached to the peripheral edge portions of different plate pairs; and the mounting bracket having a mounting portion attached to said clips and extending therefrom, so that the mounting portion extends outwardly from the plate pairs.

11. A stacked plate core device according to claim 10 wherein the mounting bracket is attached along one side of the core device adjacent to the ends of the plate pairs; and further comprising an additional identical mounting bracket attached along the opposite side of the core device adjacent to the opposite ends of the plate pairs.

12. A stacked plate core device according to claim 11 wherein the bracket mounting portions are located on one side of the C-shaped clips and extend away from the plate pairs, and further comprising first and second spacer members extending inwardly respectively from the other side of said clips, the spacer members being disposed in parallel and being attached to the plate pair peripheral edge portions.

13. A stacked plate core device according to claim 12 wherein the spacer members have distal end portions located remote from the C-shaped clips, wherein the pairs of C-shaped clips are inner pairs of spaced-apart, C-shaped clips, and wherein said distal end portions include outer pairs of first and second, spaced-apart, C-shaped clips attached to the plate peripheral edge portions.

14. A stacked plate core device according to claim 13 wherein said first and second clips of said outer pair of C-shaped clips each include an extension portion that is adapted to overlap the respective plate central planar portions.

15. A stacked plate core device according to claim 11 wherein the mounting portion includes an abutment portion which is adapted to engage an end of one of the plate pairs.

16. A stacked plate core device according to claim 11 wherein the C-shaped clips are orientated in the same direction, so that the mounting bracket attaches to one side of the plate pairs.

17. A stacked plate core device according to claim 10 wherein the means for connecting together the respective inlet and outlet openings are raised abutting bosses formed in the plate pairs surrounding the inlet and outlet openings.

18. A stacked plate core device according to claim 10 wherein the means for connecting together the respective inlet and outlet openings are manifold tubes passing therethrough and joined to the peripheral edges of the respective inlet and outlet openings, the manifold tubes defining openings therein in communication with the fluid passages in the plate pairs.

19. A stacked plate core device according to claim 10 wherein the mounting bracket is a first mounting bracket attached along one side of the heat exchanger adjacent to the ends of the plate pairs; and further comprising a plurality of additional identical, spaced-apart, mounting brackets attached along the sides of the heat exchanger adjacent to the ends of the plate pairs.

20. A stacked plate core device according to claim 10 wherein the plate pairs are spaced apart, and further comprising heat transfer fins located between the plate pairs.

* * * * *